United States Patent
Seong et al.

(10) Patent No.: US 6,687,626 B2
(45) Date of Patent: Feb. 3, 2004

(54) APPARATUS FOR MEASURING DISTRIBUTION OF FLOW RATES OF FLOWABLE MEDIUM

(75) Inventors: Dae Jin Seong, Daejeon (KR); Yong Hyeon Shin, Daejeon (KR); Jung Hyung Kim, Daejeon (KR); Jong Yeon Lim, Daejeon (KR); Kwang Hwa Jung, Daejeon (KR)

(73) Assignee: Korea Research Institute of Standars and Science (KR)

( * ) Notice: Subject to any disclaimer, the term of this patent is extended or adjusted under 35 U.S.C. 154(b) by 10 days.

(21) Appl. No.: 10/079,994

(22) Filed: Feb. 19, 2002

(65) Prior Publication Data

US 2002/0134170 A1 Sep. 26, 2002

(30) Foreign Application Priority Data

Feb. 24, 2001 (KR) .................................. 10-2001-15394

(51) Int. Cl.$^7$ ............................................... G06F 19/00
(52) U.S. Cl. ......................................... 702/45; 374/43
(58) Field of Search ............................... 702/45, 33, 12, 702/50, 100, 114; 73/861, 204.22, 204.25, 866.5, 295, 304 R; 700/281; 374/43; 361/19

(56) References Cited

U.S. PATENT DOCUMENTS

| | | | |
|---|---|---|---|
| 4,995,731 A | * | 2/1991 | Hori et al. .................... 374/43 |
| 5,502,613 A | * | 3/1996 | Saitoh et al. ................. 361/19 |
| 5,741,968 A | * | 4/1998 | Arai ......................... 73/204.22 |

* cited by examiner

Primary Examiner—John Barlow
Assistant Examiner—Xiuqin Sun
(74) Attorney, Agent, or Firm—Cantor & Colburn LLP

(57) ABSTRACT

A flux distribution measuring apparatus measures distribution of flow rates of a flowable medium. The measuring apparatus includes thin metal wire(s) for scanning a flowable medium and lead wires connected to the thin metal wire(s), wherein a voltage difference is detected between adjacent lead wires while the measuring apparatus scans the flowable medium in the direction perpendicular to a flow path of the flowable medium. The voltage differences are generated due to temperature changes in the thin metal wire(s) while scanning the flowable medium having different flow rates. The measuring apparatus visualizes the distribution of flow rates of a flowable medium using a computer which receives and processes the voltage differences detected.

14 Claims, 2 Drawing Sheets

APPARATUS FOR MEASURING DISTRIBUTION OF FLOW RATES OF FLOWABLE MEDIUM

BACKGROUND OF THE INVENTION

1. Field of the Invention

The present invention relates to an apparatus for measuring flux of a flowable medium, and more particularly, to a flux distribution measuring apparatus for measuring spatial distribution of flow rates of a flowable medium using thin metal wires to scan the flowable medium.

2. Description of the Related Art

There are various types of existing flow rate meters for measuring flow rates of a flowable medium. Typical flow rate meters for measuring flow rates in the vicinity of the atmospheric pressure generally utilize a method for measuring flow rates by rotating a fan, or a method for measuring flow rates by using thermoelectric strips or thermal wires. A thermal wire flow rate meter called an "anemometer" is an apparatus for measuring flow rates of a flowable medium, particularly turbulence, and there are basically two types of anemometers, a constant temperature anemometer (CTA) and a constant current anemometer (CCA). The CTA employing a negative feedback control theory has more advantages including a fast frequency response characteristic than the CCA, and thus the former is currently more widely used than the latter.

In case of the CTA, externally applied current or voltage is maintained so that a platinum wire of several microns thick reaches a constant temperature, and then a flow rate is determined using the amount of current which is fed back and controlled to keep the constant temperature in response to the changes of an external gaseous flow. That is, since the platinum wire is further cooled as the flow rate becomes larger, more current is demanded. Reversely, as the flow rate becomes smaller, less current is demanded. This is the same as the principle of a Pirani gauge for measuring degree of vacuum under the circumstances of low vacuum.

The above-described conventional flow rate meters can measure flow rates of certain areas of a flowable medium, but have difficulties in measuring spatial distribution of flow rates of a flowable medium. That is, the conventional flow rate meter in which a single elementary sensor is fixed can detect a flow rate at one position, but has the difficulty in measuring those at a number of places simultaneously, due to its spatial limitation. In particular, the conventional flow rate meter has more difficulties in measuring the flow rate under the circumstances of vacuum. As an example, when oxidation films and the like are chemically formed on a silicon wafer in the semiconductor manufacturing process which is performed under the conditions of a total vacuum degree of about several torrs to militorrs, it has been recognized as a crucial factor relating to a yield in the semiconductor manufacturing process to maintain constant the gaseous spray of a shower head for spraying gas at a constant flow rate onto a silicon wafer. However, it is difficult to quantitatively measure distribution of flow rates of the gaseous spray.

SUMMARY OF THE INVENTION

To solve the above and other problems, the present invention provides a flux distribution measuring apparatus in which an array of sensors is disposed to scan a flowable medium in the direction perpendicular to its flow path, to thereby detect distribution of flow rates at the scanned surfaces.

In an embodiment according to the present invention, there is provided a flux distribution measuring apparatus comprising: at least one metal thin wire for scanning a flowable medium; current supply lines each connected to each of the ends of the at least one thin metal wire, for providing current flowing through the at least one thin metal wire; and lead wires each connected to the at least one thin metal wire and having a uniform interval between adjacent lead wires, wherein voltage differences each between adjacent ones of the lead wires are detected to measure the distribution of flow rates.

BRIEF DESCRIPTION OF THE DRAWINGS

The above advantages of the present invention will become more apparent by describing the preferred embodiments thereof in detail with reference to the accompanying drawings in which.

DETAILED DESCRIPTION OF PREFERRED EMBODIMENTS

Preferred embodiments of the present invention will be described with reference to the accompanying drawings.

Figure 1:
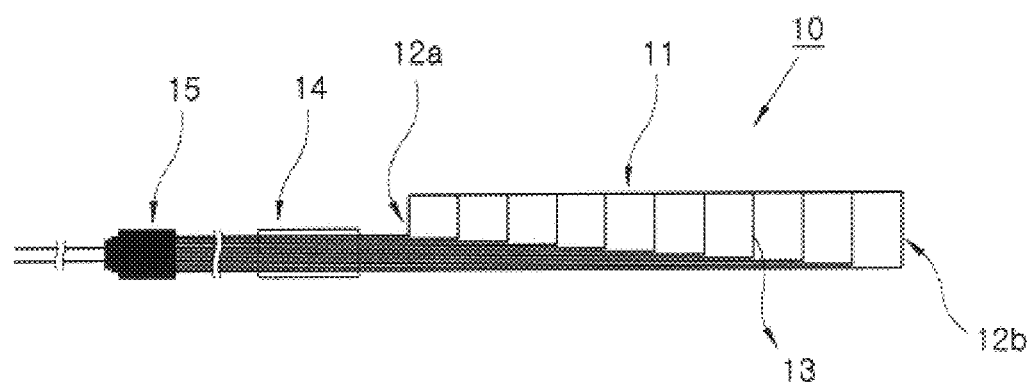
FIG. 1 is a schematic diagram showing a flux distribution measuring apparatus according to a preferred embodiment of the present invention.

In FIG. 1 showing structure of a flux distribution measuring apparatus according to a preferred embodiment of the present invention, a thin metal wire 11 is configured to have one-dimensional structure, and current supply lines 12a and 12b are connected to both ends of the thin metal wire 11, respectively. Also, lead wires 13 are connected to the thin metal wire 11 such that adjacent lead wires have a uniform interval therebetween to measure the flow rate of a medium flowing between the adjacent lead wires. The lead wires 13 each have one end connected to the thin metal wire 11 and the other end connected to a connector 15 via a supporter 14. Thus, the measuring apparatus in FIG. 1 according to a first embodiment of the present invention has a single sensor module 10 with one-dimensional structure.

Figure 2:
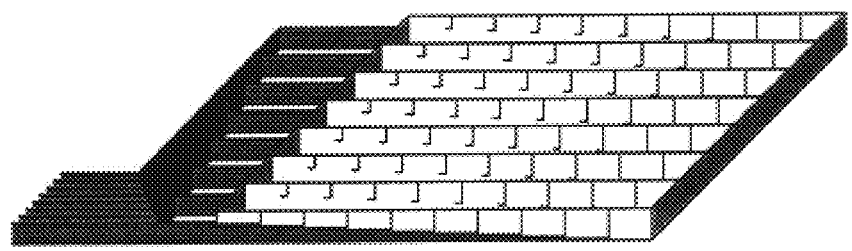
FIG. 2 is a schematic diagram showing a flux distribution measuring apparatus according to another preferred embodiment of the present invention.

FIG. 2 shows a diagram of the flux distribution measuring apparatus according to a second embodiment of the present invention, where a number of sensor modules each corresponding to the sensor module 10 in FIG. 1 are two-dimensionally arranged to extend the measuring range of flow rates of a flowable medium. In the measuring apparatus shown in FIG. 2, the lead wires each have one end connected to the thin metal wire of a corresponding sensor module and the other end connected to a connector through a supporter. The measuring apparatus in FIG. 1 measures distribution of flow rates of a flowable medium while the sensor module 10 scans a plane perpendicular to the direction of a flow path, whereas the measuring apparatus in FIG. 2 measures distribution of all the flow rates at a time with respect to a plane perpendicular to the direction of a flow path while the sensor module 10 scans the entire area of the plane at the same time.

Thus, in case that the sensor modules are arranged in the two-dimensional way, three-dimensional spatial distribution of flow rates can be measured while the sensor modules scan a flowable medium in the direction parallel to the direction of a flow path.

The present invention utilizes such an inherent property of metal that electrical resistance of metal varies according to changes in temperature of the metal. For example, in the case of platinum, the electrical resistance varies by up to about $4 \times 10^{-3}$ times as temperature varies by 1° C. in the vicinity of the normal temperature. In the case of nickel, the electrical resistance varies by about $6 \times 10^{-3}$ times as temperature varies by about 1° C. Thus, these metal wires can be used for, for example, a thermometer, Pirani gauge for measuring a low vacuum, or a flow rate measuring apparatus. When molecules of a flowable medium (e.g., gas) collide with a thin metal wire whose temperature is maintained constant, the colliding molecules transfer heat from the heated thermal wire. In case of a heated flowable medium, the colliding molecules with a high temperature transfer heat to the thin metal wire. As a result, temperature changes occur in the thin metal wire. The temperature change causes electrical resistance variation in the thin metal wire. Accordingly, by detecting the electrical resistance variation in the thin metal wire, the number of particles (i.e., a pressure) and/or flow rates of a flowable medium in a vessel can be measured.

The above-described principle is applicable to the flux distribution measuring apparatus of the present invention, where the thin metal wire 11 is arranged in a one-dimensional or two-dimensional array, as shown in FIG. 1 or 2. Here, since the thin metal wire 11 is sequentially connected to form a line, it is difficult to measure distribution of flow rates using changes of current in the thin metal wire 11. Thus, in the measuring apparatus according to the present invention, constant current is applied to flow through the thin metal wire 11, and resistance changes or temperature changes in the lead wires 13 connected with the thin wire 11 are measured by detecting a voltage difference between adjacent ones of the lead wires 13. The measuring apparatus according to the present invention detects a voltage difference corresponding to a temperature change in the thin metal wire 11, thereby measuring the flow rate of a flowing medium.

Current is applied to flow through current supply lines 12a and 12b connected to both ends of the thin metal wire 11 for a predetermined time, so that the thin metal wire 11 becomes a thermal wire having sufficiently higher temperature than that of a flowing medium (e.g., ambient gas). The current flowing through the current supply lines 12a and 12b is preferably constant current. The current flowing through the thin metal wire may also be locked in by using alternating current having a predetermined frequency. The voltage difference measured between adjacent lead wires 13 connected to the thin metal wire 11 at a predetermined interval provides information about flow rates of a medium flowing the corresponding portion of the thin metal wire 11. Accordingly, distribution of flow rates on an one-dimensional line or two-dimensional plane is obtained from the voltage differences each measured between adjacent lead wires. To facilitate the measuring operation, the measuring apparatus of the present invention preferably employs the thin metal wire 11 fabricated not to interrupt the flow of a flowable medium (e.g., gaseous flow) and a voltage detecting means to detect even feeble voltage changes in the lead wires.

Figure 3:
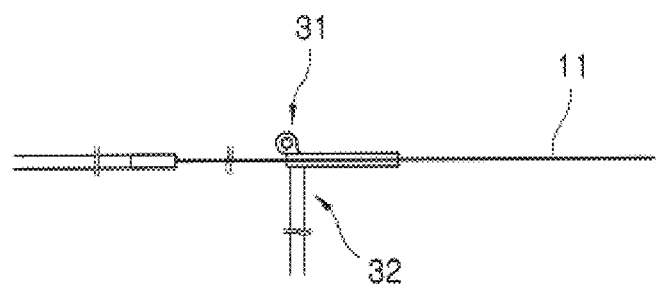
FIG. 3 is a schematic diagram showing a rotating mechanism used in a flux distribution measuring apparatus according to a preferred embodiment of the present invention.

Referring to FIG. 3, a schematic diagram is provided for illustrating an exemplary rotating mechanism used in the measuring apparatus according to the present invention. A rotary central axis 31 is connected to a selected portion (e.g., one end) of the measuring apparatus. A pushing rod 32 is connected to the rotary central axis 31 downwards in the vertical direction or in the direction perpendicular to the rotary central axis 31. Thus, if the pushing rod 32 is pushed in a predetermined direction to rotate the central axis 31, then the measuring apparatus connected to the central axis 31 is rotated together with the central axis 31. The measuring apparatus scans areas or planes of a flowable medium to be measured while the thin metal wire 11 is rotated. In particular, the rotary central axis 31 rotates a module made of the thin metal wire 11, the current supply lines 12a, 12b, the lead wires 13 and other components, so that the module scans the flowable medium in the direction perpendicular to its flow path. It should be noted that the scanning operation is feasible in different ways such that, for example, a pushing rod is installed in such a manner that the measuring apparatus scans a flowable medium by making linear movement in the direction perpendicular to the thin metal wire 11.

The measuring apparatus for measuring distribution of flow rates of a flowable medium according to the present invention will be described in more detail with an example in that the measuring apparatus of the present invention is applied in a semiconductor manufacturing process.

Figure 4:
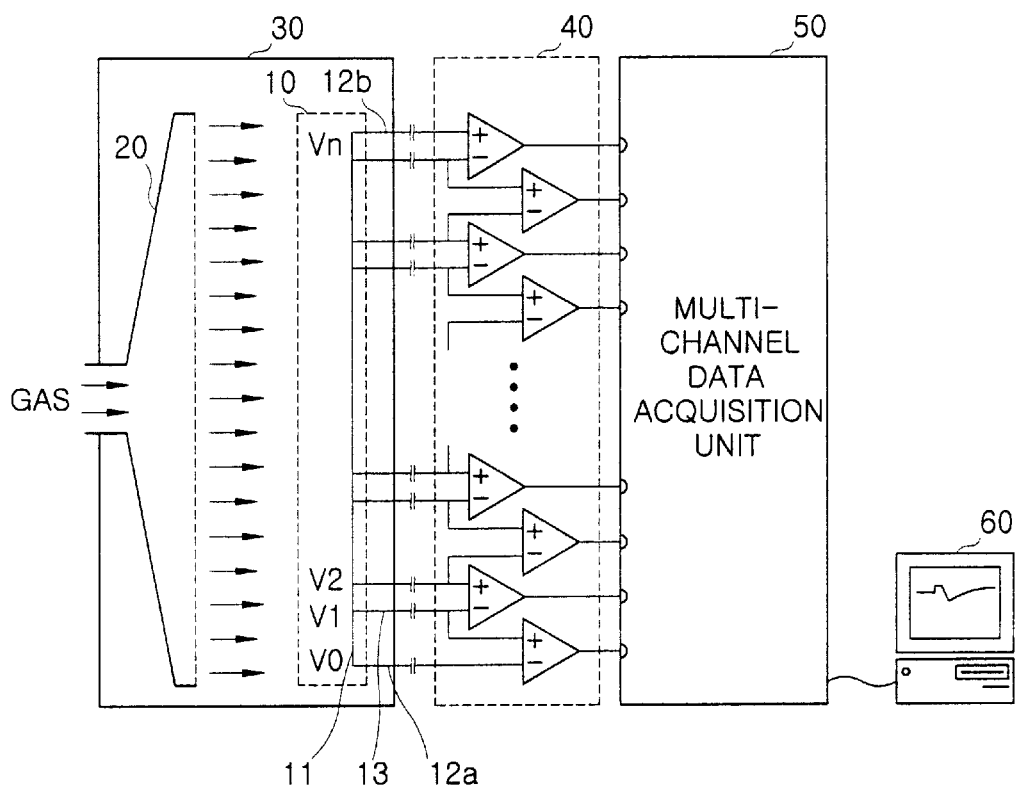
FIG. 4 is a schematic view showing a flux distribution measuring apparatus for visualizing distribution of flow rates according to a preferred embodiment of the present invention.

In FIG. 4, a measuring apparatus 10 according to the present invention is installed in a vacuum chamber 30. The measuring apparatus 10 is installed opposite to a shower head 20 for spraying gas. Temperature changes may be caused in a thin metal wire 11 in the measuring apparatus 10 by the gas sprayed from the shower head 20. Current supply lines 12a, 12b are respectively connected to the ends of the thin metal wire 11, and the lead wires 13 are connected to the thin metal wire 11 in such a manner that the lead wires 13 are arranged in parallel to each other and have a uniform interval between adjacent lead wires.

The measuring apparatus 10 is connected with a signal conditioner 40 including multiple differential amplifiers each for detecting a voltage difference between adjacent lead wires or between a current supply line and a lead wire adjacent to the current supply line. The differential amplifiers receive voltages V0, V1, . . . , Vn at the respective nodes on the thin metal wire 11 at which the respective lead wires 13 and current supply lines 12a and 12b are connected to the thin metal wire 11. As shown in FIG. 4, the differential amplifiers respectively receive voltages V0, V1, . . . , Vn at "n" nodes on the thin metal wire 11, and each differential amplifier obtains a voltage difference between adjacent ones of the nodes. Each differential amplifier in the signal conditioner 40 then amplifies the obtained voltage difference by a predetermined magnitude, and then outputs the result to a multi-channel data acquisition unit 50. The multi-channel data acquisition unit 50 receives the input voltage differences from the signal conditioner 40 and, preferably, processes them as single data, and outputs result data to a computer 60. Preferably, the result data is digital data representing the voltage differences obtained by the respective differential amplifiers in the signal conditioner 40. The computer 60 visualizes the distribution of flow rates of the gas by manipulating the result data received from the multi-channel data acquisition unit 50. Therefore, the distribution of flow rates may be observed by detecting voltage changes on the thin metal wire 11 as time changes. Further, the computer 60 may visualize the distribution of flow rates in the form of a graph or a three-dimensional map.

As described above, the flux distribution measuring apparatus according to the present invention provides an effect of visualizing the spatial distribution of flow rates of a flowable medium, in which the operational principles of Pirani gauge and CTA flow meter are applied, and the thin metal wire for scanning a flowable medium is arranged, for example, in one- or two-dimensional structure. Also, the present invention can be adopted in a process for maintaining a constant distribution of gas flow rates in a semiconductor manufacturing process. Further, the present invention can be used as a vacuum gauge.

What is claimed is:

1. An apparatus for measuring distribution of flow rates of a flowable medium, comprising:

a metal wire far scanning the flowable medium;

current supply lines each connected to each of ends of the metal wire, for providing current flowing through the metal wire;

lead wires each connected to the metal wire and having a uniform interval between adjacent lead wires; and differential amplifiers each for detecting a voltage difference between the adjacent lead wires, the differential amplifiers including a first differential amplifier for detecting a voltage difference between one of the current supply lines and a lead wire adjacent to the one of the current supply lines, and a second differential amplifier for detecting a voltage difference between the other of the current supply lines and a lead wire adjacent to the other of the current supply lines.

2. The measuring apparatus of claim 1, wherein the metal wire includes multiple metal wires each connected to the current supply lines and the lead wires, the multiple metal wires being arranged in such a way as to measure at a time the distribution of flow rates on a plane of the flowable medium.

3. The measuring apparatus of claim 2, further comprising:

a rotary central axis connected to a sensor module having the metal wire, the current supply lines, and the lead wires; and a pushing rod connected to the rotary central axis and disposed downwards in a direction perpendicular to the rotary central axis.

4. The measuring apparatus of claim 3, wherein the measuring apparatus scans spatial areas of the flowable medium by pushing the pushing rod to rotate the rotary central axis with which the sensor module is rotated.

5. The measuring apparatus of claim 4, wherein the sensor module scans the flowable medium in a direction perpendicular to a flow path of the flowable medium.

6. The measuring apparatus of claim 2, wherein the metal wire includes a plurality of thin metal wires arranged in parallel to each other.

7. The measuring apparatus of claim 1, further comprising:

a signal conditioner including differential amplifiers each for obtaining the voltage differences between the adjacent lead wires;

a multi-channel data acquisition unit for processing the voltage differences provided from the respective differential amplifiers to generate digital data representing the voltage differences; and a computer for visualizing the distribution of flow rates in response to the digital data provided from the multi-channel data acquisition unit.

8. The measuring apparatus of claim 7, wherein the distribution of flow rates is observed by the computer in the form of a graph with relation to time lapse.

9. The measuring apparatus of claim 7, wherein the differential amplifiers are connected to the lead wires such that one end of each lead wire is connected to corresponding one of the differential amplifiers and the other end of each lead wire is connected to the metal wire.

10. The measuring apparatus of claim 9, wherein each of the differential amplifiers is connected with two lead wires to detect a voltage difference between the two lead wires.

11. The measuring apparatus of claim 1, wherein constant current is applied to the current supply lines to provide the metal wire with constant current.

12. The measuring apparatus of claim 1, wherein alternating current having a predetermined frequency is applied to the current supply lines and is locked in.

13. The measuring apparatus of claim 1, wherein the measuring apparatus is used in a semiconductor manufacturing process.

14. The measuring apparatus of claim 13, wherein the measuring apparatus is in a position opposite to a shower head in a vacuum chamber to measure the distribution of flow rates of gas sprayed from the shower head.

* * * * *